United States Patent [19]

Munn et al.

[11] Patent Number: 4,598,974

[45] Date of Patent: Jul. 8, 1986

[54] OPTICAL FIBER CONNECTOR HAVING INTEGRAL ELECTRODES FOR USE IN FUSION SPLICING

[75] Inventors: Robert D. Munn; George R. Stilwell, Jr., both of Raleigh, N.C.

[73] Assignee: International Business Machines Corporation, Armonk, N.Y.

[21] Appl. No.: 765,756

[22] Filed: Aug. 15, 1985

[51] Int. Cl.⁴ .............................................. G02B 6/38
[52] U.S. Cl. .................................................. 350/96.21
[58] Field of Search ................ 350/96.20, 96.21, 96.22

[56] References Cited

U.S. PATENT DOCUMENTS

| 4,049,414 | 9/1977 | Smith | 350/96.21 |
| 4,220,394 | 9/1980 | Tardy | 350/96.21 |
| 4,561,719 | 12/1985 | Quan | 350/96.21 |

FOREIGN PATENT DOCUMENTS 2851001  5/1979  Fed. Rep. of Germany ... 350/96.21

Primary Examiner—William L. Sikes
Assistant Examiner—Lester Rushin, III
Attorney, Agent, or Firm—Gerald R. Woods

[57] ABSTRACT

An optical fiber connector includes a ferrule with an interior splice chamber. A fiber stub is installed in the ferrule in a factory operation with one end in the splice chamber. The ferrule also includes permanent, opposed electrodes with tips at the walls of the splice chamber. To attach the connector to an optical cable in a field operation, a predetermined length of insulation is stripped from the end of the cable and the bare fiber is inserted into the splice chamber through a bore in the ferrule. Voltage is applied across the electrodes to create a plasma arc in the splice chamber. The plasma arc melts and fuses the adjacent ends of the cable fiber and fiber stub.

4 Claims, 1 Drawing Figure

OPTICAL FIBER CONNECTOR HAVING INTEGRAL ELECTRODES FOR USE IN FUSION SPLICING

BACKGROUND OF THE INVENTION

1. Prior Art

The present invention relates to an optical fiber connector and more particularly to a connector having integral electrodes for use in fusion splicing of adjacent fiber ends when the connector is being secured to an optical cable.

Light-transmitting or optical fibers have a number of properties which favor their use as data communications media. In comparison to electrical conductors, optical fibers can carry data at higher rates, provide substantial immunity from signal degradation due to external electromagnetic sources and offer better security against unauthorized signal diversion; i.e., wire tapping.

One factor which has discouraged widespread use of optical fibers is the difficulty in achieving reliable, low-loss connections between adjacent fibers. Such connections can routinely be made in laboratory or other controlled environments by skilled personnel using known equipment and techniques. The same equipment and techniques are not considered suitable in many commercial environments where economics dictate that connections must be made quickly by personnel with limited skills.

One approach to developing an optical fiber connector suitable for use in commercial environments has been to pre-assemble a short length of optical fiber in the connector housing during factory fabrication of the connector. This pre-assembly permits the exposed end of the fiber to be polished in the factory. In the field, such a connector is secured to the end of an optical cable with the ends of the connector fiber and cable fiber being joined using mechanical or fusion splicing techniques. An example of such a connector is shown in U.S. Pat. No. 4,220,394.

That patent employs one form of fusion splicing technique. The two ends of the fibers that meet within the connector are welded using an oxyhydrogen micro-blowpipe which produces a flame hot enough to soften and fuse the glass ends of the fibers.

Another known type of fusion splicing technique requires that the fiber ends be brought into precise alignment relative to spaced electrodes. The spaced electrodes are part of a splicing device which includes a microscope and micro-manipulators which align the fiber ends relative to each other. The micro-manipulators are also used to align the electrodes with the junction of the two fibers. When the fibers and electrodes are aligned, a potential is imposed across the electrodes. A resulting plasma arc melts and fuses the adjacent ends of the optical fibers.

A considerable amount of skill and time is required use such a device, one example of which is shown in U.S. Pat. No. 4,266,852.

Because fusion splicing devices of the type described above are relatively costly, take considerable time per splice and can be used effectively only by persons with considerable training and skill, such devices are not considered practical for installation of fiber optic components in field or commercial environments.

SUMMARY OF THE INVENTION

The present invention is a fiber optic connector which simplifies the fusion splicing of the fibers in the field by using electrodes which are integral to the connector. The connector includes a ferrule having walls which define an interior splice chamber. First and second bores extend from the splice chamber to first and second points of the exterior of the ferrule surface. A fiber stub is secured within the first bore and extends from the first exterior point into the splice chamber. Splice electrodes are permanently mounted in the ferrule walls and have inwardly extending tips which define an arc gap within the splice chamber. When a fiber in an optical cable is inserted through the second bore into the splice chamber, voltage is supplied to the permanently mounted splice electrodes to create a plasma arc which fuses one end of the fiber stub to the adjacent end of the cable fiber.

DESCRIPTION OF THE DRAWING

While the Specification concludes with claims particularly pointing out and distinctly claiming that which is regarded as the present invention, details of a preferred embodiment of the invention might be more readily ascertained from the following technical description when read in conjunction with the accompanying drawing, which is a cross-sectional view of an optical fiber connector constructed in accordance with the present invention.

TECHNICAL DESCRIPTION

Figure 1:
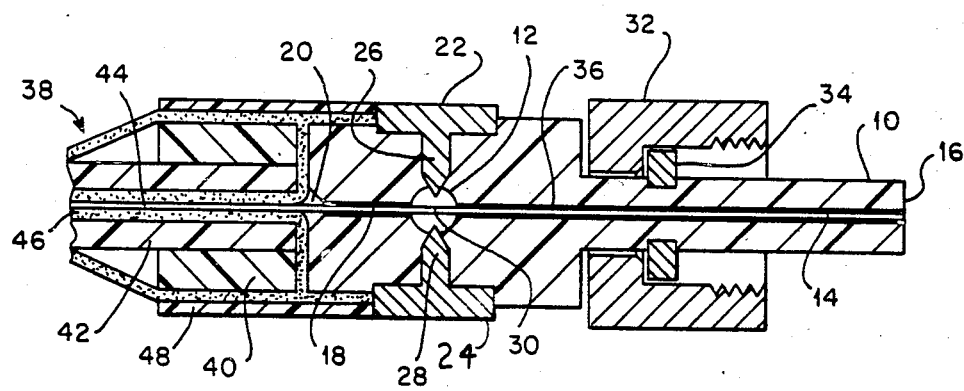

Referring to the drawing, the connector includes an annular ferrule 10 which has an interior splice chamber 12, a first bore 14 leading from the splice chamber 12 to a first exterior point or face 16 of the ferrule and a second bore 18 leading from the splice chamber 12 to a second exterior point 20 of the ferrule.

The connector includes a pair of diametrically opposite metal electrodes 22 and 24 which are permanently mounted in the ferrule during its factory fabrication. The electrodes 22 and 24 include inwardly extending tips 26 and 28, respectively, which form an arc gap 30 within the splice chamber 12. The splice chamber 12 can be formed during molding of ferrule 10 by positioning a cylindrical insert (not shown) in the mold cavity orthogonal to the electrodes 22 and 24 so that the insert extends through the region of arc gap 30. After the mold cavity is filled, the insert is removed. The intersection of the insert and the electrodes form the splice chamber 12 while the openings to the ferrule surface provide vent holes. The vent holes relieve the high pressure which would otherwise occur in a sealed splice chamber as a result of the arcing during the fusion operation.

The connector further includes an attachment nut 32 and a retaining ring 34, both of which are installed during factory fabrication. The remaining component of the connector which is installed during factory fabrication is a short length of optical fiber 36 which extends from the face 16 of the connector to the vicinity of the arc gap 30 within the splice chamber 12. Optical fiber 36 can be installed in a precision operation so that the end within the splice chamber 12 can be accurately positioned relative to the tips of the electrodes 22 and 24. The opposite end of fiber 36 can be polished at face 16 to reduce any losses at face 16 when the connector is coupled to a complementary connector in the field.

The ferrule 10 must be made of an insulating material 10 or at least be insulated from the electrodes 22 and 24 so the voltage applied to electrodes 22 and 24 will not create any potential at other points on the ferrule. While ferrule 10 is shown as a single, apparently integral component, the ferrule might actually be made in two parts to simplify the creation of the splice chamber 12 and the first and second bores 14 and 18. The two parts could then be bonded using suitable adhesives or other securing techniques.

When installing the connector described above on an optical cable 38, the cable 38 is first prepared by slipping a strain ring 40 onto the insulation 42 of the cable. The end of the cable is prepared by stripping the insulation 42 from a predetermined length of the cable. To expose the cable fiber 44, packing 46 is folded back over the strain ring 40. To ensure that the end of cable fiber 44 touches the end of fiber 36 without undue stress, it is necessary that an appropriate length of cable fiber be exposed during cable preparation. This can be accomplished through proper design of the hand tool used to cut and strip the end of the cable fiber. The hand tool is not part of the present invention and is not illustrated.

The cable end and strain ring 40 are inserted into a strain relief sleeve 48 with the free end of fiber 44 being guided through the second bore 18 into the splice chamber 12.

Voltage is applied to the electrodes 22 and 24 for a predetermined length of time to create a plasma arc within splice chamber 12 to fuse the adjacent ends of fibers 36 and 44. Slight misalignment between fibers 36 and 44 prior to the actual fusion step is not critical. During the fusion of the fiber ends, the surface tension of the molten glass causes the two fibers to be drawn into better alignment. Attachment of the connector to the cable 38 is completed by crimping or heat shrinking the strain relief sleeve 48 to provide a mechanical connection between the ferrule 10 and cable 38 through the strain ring 40.

While there has been described what is considered to be a preferred embodiment of the invention, variations and modifications therein will occur to those skilled in the art once they learn of the basic inventive concept. Therefore, it is intended that the appended claims shall be construed to include both the preferred embodiment and all variations and modifications that fall within the true spirit and scope of the invention.

We claim:

1. A fiber optic connector comprising:
   (a) a ferrule having walls defining an interior splice chamber and first and second bores forming fiber-receiving paths extending from the splice chamber to first and second exterior points on the ferrule surface;
   (b) a fiber stub secured within the first bore and extending from the first exterior point into the splice chamber; and
   (c) splice electrodes permanently mounted in the ferrule walls and having inwardly extending tips defining an arc gap within the splice chamber, said electrodes being connectable to a voltage source for creating a plasma arc at the gap capable of fusing one end of the fiber stub to one end of a cable fiber guided into the splice chamber through the second bore.

2. A fiber optic connector as defined in Claim 1 wherein the ferrule is made of an insulating material.

3. A fiber optic connector as defined in either of Claims 1 or 2 wherein the cable to be connected to the connector includes a central optical fiber surrounded by a layer of insulation and wherein said connector further includes a strain ring which is placed over the insulation adjacent the end of the cable and a strain relief sleeve which encircles both the strain ring and a portion of the ferrule, said sleeve being made of a material which can be deformed to create a mechanical connection between the cable and the ferrule.

4. A fiber optic connector as defined in Claim 3 further including at least one opening extending from the splice chamber to the exterior of the connector, said opening serving as a pressure-relieving vent.

* * * * *